(12) United States Patent
Chen

(10) Patent No.: US 6,261,191 B1
(45) Date of Patent: Jul. 17, 2001

(54) MULTI-SURFACE GRIP TAPE FOR HANDLE

(76) Inventor: Sam Hsin-Shun Chen, 13947 Carriage Rd., Poway, CA (US) 92064

( * ) Notice: Subject to any disclaimer, the term of this patent is extended or adjusted under 35 U.S.C. 154(b) by 0 days.

(21) Appl. No.: 09/361,599

(22) Filed: Jul. 27, 1999

(51) Int. Cl.$^7$ .................................................. B32B 3/00
(52) U.S. Cl. ..................... 473/302; 473/300; 473/303; 473/301; 428/130; 428/167
(58) Field of Search ................... 473/302, 300, 473/298, 303, FOR 171, 301; 428/130, 151, 167, 906

(56) References Cited

U.S. PATENT DOCUMENTS

| | | | | |
|---|---|---|---|---|
| 3,028,283 | * | 4/1962 | Lundgren et al. | 473/302 X |
| 4,174,109 | * | 11/1979 | Gaiser | 273/81.6 |
| 4,476,742 | * | 10/1984 | Midgley | 74/551.9 |
| 5,055,340 | * | 10/1991 | Matsumura et al. | 428/172 |
| 5,158,287 | * | 10/1992 | Janes | 273/73 J |
| 5,397,123 | * | 3/1995 | Huang | 473/300 X |
| 5,435,549 | * | 7/1995 | Chen | 473/300 X |
| 5,851,632 | * | 12/1998 | Chen et al. | 473/302 X |

* cited by examiner

*Primary Examiner*—Daniel Zirker
(74) *Attorney, Agent, or Firm*—Calif Tervo

(57) ABSTRACT

A grip tape for wrapping a handle for enhancing the shock absorption and traction of the handle comprises an elongate tape having a bottom, a left side, a right side, and a top having an outer surface for gripping. The top of the tape includes a first material having a top comprising a part of the outer surface and a second material, different from the first material, having a top also comprising a part of the outer surface. Preferably, the first material is a more cushioning material than the second material and the top of the first material is higher than the top of the second material. In another embodiment, in lateral cross section, the first material is central and the second material is disposed to both sides. Typical materials, listed in order of first material to second material, include: thermoplastic rubber, polyurethane (synthetic leather), leather, synthetic cork, and sandpaper. Three or more materials can be used. In another embodiment, the first material traverses the tape such that it presents traction enhancing edges for resisting torque.

19 Claims, 1 Drawing Sheet

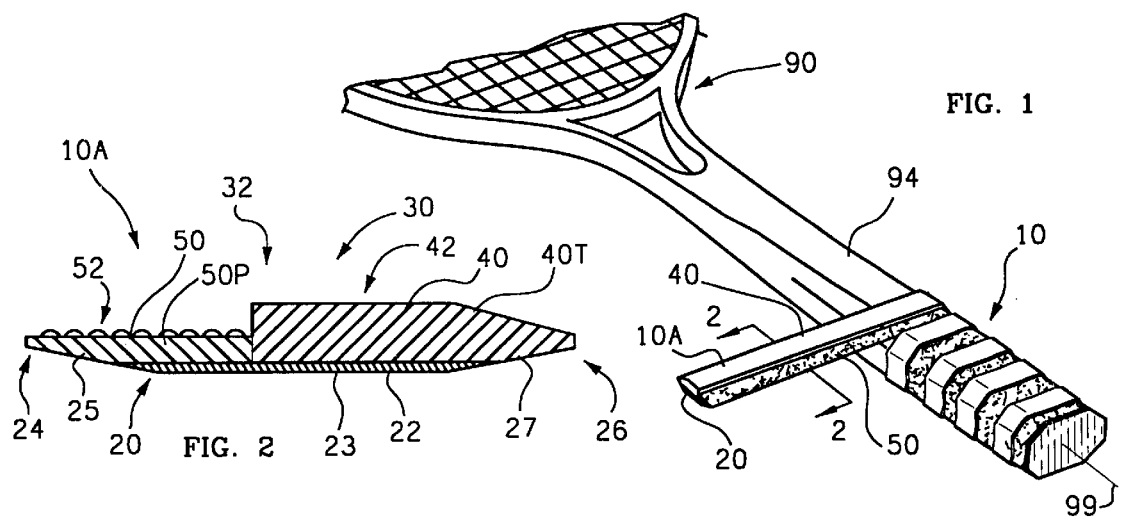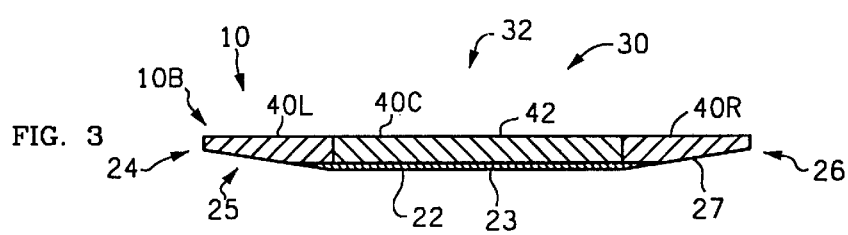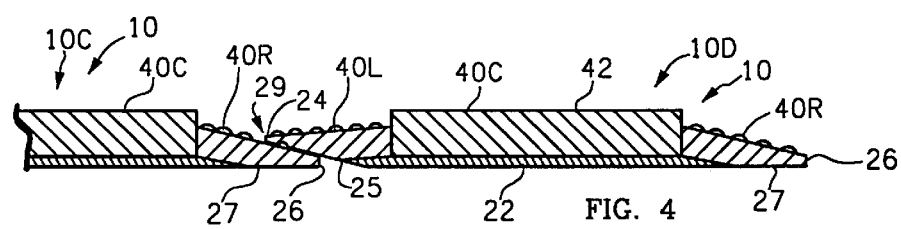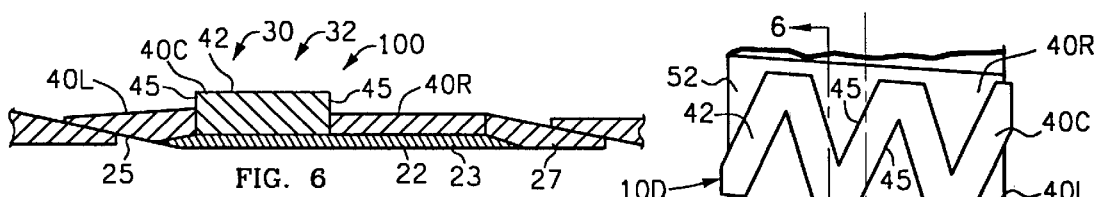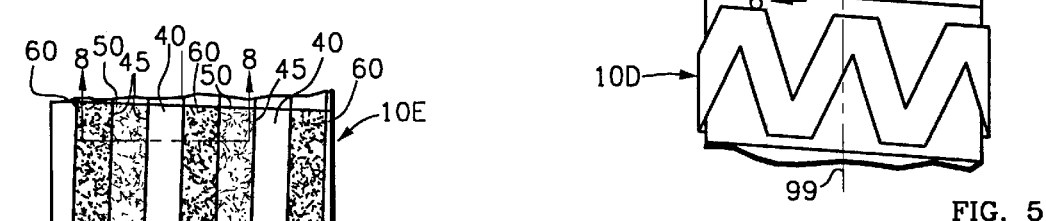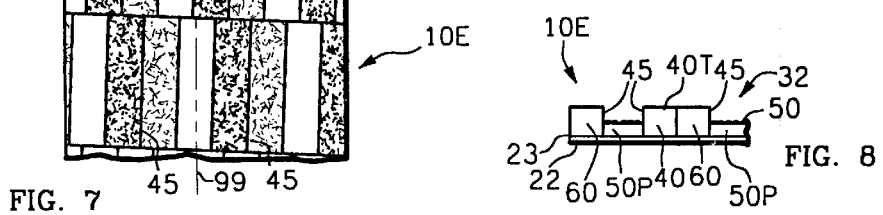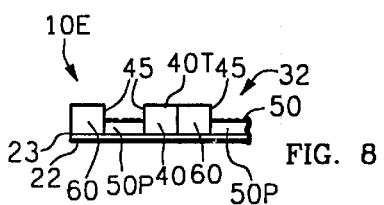

MULTI-SURFACE GRIP TAPE FOR HANDLE

BACKGROUND OF THE INVENTION

1. Field of the Invention

This invention relates in general to an improved grip tape for a handle, and more specifically to a grip tape having a top gripping surface comprised of a plurality of materials; each material having an associated area of the top gripping surfaces.

2. Background of the Invention

Grip tape for wrapping a racquet handle to enhance grip and/or to reduce shock is well-known. A common conventional grip tape of polyurethane comprises a layer of grip material backed with a layer of felt. The felt layer provides part of the elasticity, strength, cushioning and shock resistance. The bottom of the tape may be skived (beveled) such that the tape can be spiral wrapped with overlapping edges. Other common grip materials for grip tapes are leather, rubber and plastic.

A problem with conventional grip tapes is that each grip material has characteristics which make it desirable and characteristics that make it undesirable. Desirable characteristics include durability and abrasion resistance, shock absorption or cushiness, tackiness, traction when wet, and dryness. For example, polyurethane provides greater shock absorption than leather, but leather is more durable. Thus, each grip material is a compromise.

Prior attempts to improve grips have focused mainly on physically modifying the grip surface. For example, a resin or tackifying agent has been applied to leather, and surface projections have been added to polyurethane. Pores have been added to reduce wetness. These attempts generally enhance only one desirable characteristic of a grip.

Therefore, there has been a need for an improved grip tape that is superior to existing tapes.

SUMMARY OF THE INVENTION

A grip tape for wrapping a handle for enhancing the shock absorption and traction of the handle comprises an elongate tape having a bottom, a left side, a right side, and a top having an outer surface for gripping. The top of the tape includes a first material having a top comprising a part of the outer surface and a second material, different from the first material, having a top also comprising a part of the outer surface. Preferably, the first material is a more cushioning material than the second material, and the top of the first material is higher than the top of the second material. In another embodiment, in lateral cross section, the first material is central and the second material is disposed to both sides. Typical materials, listed in order of first material to second material, include: thermoplastic rubber, polyurethane (synthetic leather), leather, synthetic cork, and sandpaper. Three or more materials can be used.

In another embodiment, the first material traverses the tape such that it presents traction enhancing edges for resisting torque.

Preferably, the tape is spiral wrapped around a handle such that the right side overlies the top of the left side of the previous turn.

Other features and many attendant advantages of the invention will become more apparent upon a reading of the following detailed description together with the drawings in which like reference numerals refer to like parts throughout.

BRIEF DESCRIPTION OF THE DRAWINGS

FIG. 1 is a perspective view of the handle of a sporting racquet with a preferred embodiment of the tape of the invention spiral wound around the handle.

FIG. 2 is a partially cut away, lateral cross sectional view taken on line 2—2 of FIG. 1 of the tape of FIG. 1.

FIG. 3 is a lateral cross sectional view of a second embodiment of the tape of the invention.

FIG. 4 is a lateral cross sectional view of a third embodiment of the tape showing tapes with overlapping winding.

FIG. 5 is a partial, top plan view of a wrapping of a fourth embodiment of the tape.

FIG. 6 is an enlarged, sectional view taken on line 6—6 of FIG. 5.

FIG. 7 is a partial, top plan view of a wrapping of a fifth embodiment of the tape.

FIG. 8 is a sectional view taken on line 8—8 of FIG. 7.

DETAILED DESCRIPTION OF THE INVENTION

With reference now to the drawings, FIG. 1 is a perspective view of the handle 94 of a sporting racquet 90 with a first preferred embodiment 10A of the grip tape 10 of the invention spiral wound around the handle 94. FIG. 2 is a partially cut away, lateral cross sectional view taken on line 2—2 of FIG. 1 of the grip tape 10A of FIG. 1. Although a handle for a tennis racquet is shown, the principles of grip tape 10 of the invention are applicable to any device having a handle which is to be gripped, including the handle of such things as a hammer, golf club, or baseball bat, or the handles of a bicycle, wheel barrow or other machine. Grip tape 10 of the invention is particularly applicable to devices that are subject to shock and require a firm grip even when the user's hands are wet.

Tape 10A has a bottom 20, a left side 24, a right side 26, and a top 30, having an outer surface 32 for gripping by the user. Top 30 includes a first material 40, such as thermoplastic rubber 40T, having a top 42, and a second material 50, such as sandpaper 50P different from first material 40 and having a top 52. Top 42 of first material 40 and top 52 of second material 50 each comprise a part of outer surface 32.

Thermoplastic rubber 40T provides high shock absorption, good durability and tackiness. However, because thermoplastic rubber 40T does not dry readily and is extremely slippery when wet, it is not commonly used as a grip material. In contrast, sandpaper 50P is drying and provides superior traction when wet. However, because sandpaper 50P provides almost no shock absorption, is not very durable and is not tacky, it is not used as grip material. High traction is an important consideration in a tennis racquet grip because of the large torque imparted when the longitudinal axis 99 of handle 94 does not pass through the ball being struck. Therefore, for this use, a considerable area of high traction material is desirable.

Preferably, top 42 of the more cushioning material, such as thermoplastic rubber 40T, is higher than top 52 of lesser cushioning material, such as sandpaper 50P. Some materials which are contemplated for combined use in such as manner are, listed in order of first material to second material: thermoplastic rubber, polyurethane (synthetic leather), leather, synthetic cork, and sandpaper. With the preferred embodiment, a loose grip by the user on handle 94 is primarily supported by cushioning material 40. The tighter handle 94 is gripped, the more cushioning material 40 is compressed and the greater the contact of the user's hand with the higher traction sandpaper 50P. Thus, in this manner, the user has additional control over the characteristics of the grip.

As seen in FIG. 1, when tape 10A is spiral wound around handle 94, first material 40 and second material 50 are oriented at the angle of the spiral off from being circumferential.

Generally, and as shown, bottom 20 of tape 10 also includes a bottom material 22 attached such as by adhesive or other bonding. Bottom material 22 is commonly a shock absorbing material, such as an open-pored textile, such as felt 23.

In the preferred embodiment, bottom 20 is skived or beveled, such as by cutting, from bottom 20 upward to right side 26 to define a right bevel portion 27 overlying the bevel, and bottom 20 is skived or beveled from bottom 20 upwards to left side 24 to define a left bevel portion 25 overlying the bevel. Tape 10 is stretched and tightly spiral wrapped around handle 94 such that tape 10 flattens against any underlying surface. Preferably, on each succeeding spiral, left bevel portion 25 at least partially overlaps top 42 of right bevel portion 27 of the previous turn.

Tape 10 may include a layer of glue, adhesive or two-sided tape (not shown) on all or part of its lower surface to aid in adherence upon wrapping upon handle 94.

Dimensions of the elements of tape 10 vary depending upon the application. Typical dimensions for a tennis racquet tape, such as 10A, would be: width, 20–30 mm; felt thickness, 0.3–1.0 mm, sandpaper thickness, 0.5–1.0 mm; and thermoplastic rubber thickness, 0.5–1.0 mm. In another tennis grip tape, first material 40 is polyurethane and second material 50 is leather. The grip for a hammer handle, not being subject to high torque, may be much thicker and provide more total cushioning. For a hammer handle, first material 40 may be thermoplastic rubber 40T and second material 50 may be cork. Both materials 40,50 may be thick, 3–8 mm, and of the same height. The thermoplastic rubber provides good shock absorption, and the cork provides sufficient additional dryness and hand traction to provide greater utility under damp or wet conditions.

FIG. 3 illustrates a second preferred embodiment 10B of tape 10 wherein top 30 includes a plurality of materials, such as central material 40C with different material, such as left material 40L, and right material 40R, toward each side 24,26. For example, central material 40C may be polyurethane, left material 40L may be cork and right material 40R may be leather. The height and width of the three materials may be selected to achieve the desired characteristics for the particular application.

Alternatively, as seen in FIG. 4, left material 40L and right material 40R may be the same material. For example, center material 40C may be leather, sandpaper or cork, and left and right materials 40L,40R may be polyurethane. Or, central material 40C may be cork or sandpaper and left and right materials may be leather or polyurethane. In FIG. 4, there is shown a lateral cross sectional view of a third embodiment 10C of tape 10 showing tapes 10 with overlapping winding. In the preferred embodiment of FIG. 4, central material 40C, is a higher cushioning material, such as thermoplastic rubber 40T, and left and right material 40L,40R is a higher traction material, such as sandpaper 50P. Preferably, cushioning material 40T has a top 42 above the top 52 of sandpaper 50P. Left bevel portion 25 overlaps right bevel portion 27 and creates a seam 29 that lies below top 42 of central material 40C. This protects left side edge 24 which is adjacent seam 29 from the undesirable characteristic of being rolled up during use. Other combinations of materials will each produce grip characteristics that are superior for a given function and environment.

Looking now at FIGS. 5 and 6, FIG. 5 is a partial, top plan view of a fourth embodiment 10D of tape 10 wrapped on a handle, and FIG. 6 is an enlarged, sectional view taken on line 6—6 of FIG. 5. Embodiment 10D is similar to tape 10C of FIG. 4 except one of the sections, preferably central section 40C is shaped in a pattern such that it includes raised edges 45 that cross the longitudinal axis 99 of handle 94 at an angle of 45% or less and provide additional traction against torque.

FIG. 7 is a partial, top plan view of a fifth embodiment 10E of tape 10 wrapped on a handle, and FIG. 8 is a sectional view taken on line 8—8 of FIG. 7. Outer gripping surface 32 of tape 10E is comprised of the top surfaces of a plurality of materials, such as 40,50,60 that traverse the width of tape 10E. Preferably, the more cushioning and durable material, such as thermoplastic rubber 40T will have a higher top surface than a less cushioning, higher traction material, such as sandpaper 50P. In this manner many raised edges 45 are disposed at an angle of less than 30% to handle axis 99 and preferably at the wrap angle or less such that edges 45 are substantially parallel to longitudinal axis 99. Edges 45 provide additional traction against torque. Although three materials, 40,50,60 are shown, the principle applies to two or more materials.

Having described the invention, it can be seen that it provides for an improved grip tape for a handle.

Although particular embodiments of the invention have been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. A grip tape for wrapping a handle comprising:
    an elongate tape having a bottom, a left side, a right side, and a top having an outer surface for gripping; said tape comprising
    an inner layer comprising an open-pored textile including:
        an inner surface for abutting the handle; and
        an outer surface:
    said top of said tape comprising:
        a first material comprising polyurethane; said first material having:
            a bottom bonded to said top surface of said inner layer; and
            a top; said top of said first material comprising a part of said outer surface; said first material being resiliently compressible; and
        a second material, different from said first material, said second material comprising leather; said second material having:
            a bottom bonded to said top surface of said inner layer; and
            a top; said top of said second material comprising a part of said outer surface; said second material being less easily compressed than said first material.

2. The grip tape of claim 1 wherein said top of said first material is higher than said top of said second material.

3. The grip tape of claim 1 wherein, in lateral cross section, said first material is central and said second material is disposed to both sides.

4. The grip tape of claim 3 wherein said top of said first material is higher than said top of said second material.

5. The grip tape of claim 1 wherein said first material traverses said tape.

6. The grip tape of claim 5 wherein said top of said first material is higher than said top of said second material such that it presents traction enhancing edges for resisting torque.

7. The grip tape of claim 6 wherein said traction enhancing edges are disposed at an angle of less than 30% to the longitudinal axis of the handle.

8. The grip tape of claim 6 wherein said traction enhancing edges are disposed substantially parallel to the longitudinal axis of the handle.

9. In combination:
a handle; and
a grip overlying said handle comprising:
    an elongate tape having a bottom, a left side, a right side, and a top having an outer surface for gripping; said tape comprising
    an inner layer comprising an open-pored textile including:
        an inner surface for abutting the handle; and
        an outer surface;
    said top of said tape comprising:
        a first material comprising polyurethane: said first material having:
            a bottom bonded to said top surface of said inner layer; and
            a top; said top of said first material comprising a part of said outer surface; said first material being resiliently compressible; and
        a second material, different from said first material, said second material comprising leather; said second material having:
            a bottom bonded to said top surface of said inner layer; and
            a top; said top of said second material comprising a part of said outer surface; said second material being less easily compressed than said first material; said tape spiral wrapped around said handle.

10. The combination of claim 9 wherein said tape is wrapped such that said right side overlies said top of said left side of the previous turn.

11. The grip tape of claim 9 wherein said top of said first material is higher than said top of said second material.

12. A grip tape for wrapping a handle comprising:
an elongate tape having a bottom, a left side, a right side, and a top having an outer surface for gripping; said tape comprising
    an inner layer comprising an open-pored textile including:
        an inner surface for abutting the handle; and
        an outer surface;
    said top of said tape comprising:
        a first material comprising foam rubber; said first material having:
            a bottom bonded to said top surface of said inner layer; and
            a top; said top of said first material comprising a part of said outer surface; said first material being resiliently compressible; and
        a second material, different from said first material, said second material comprising leather; said second material having:
            a bottom bonded to said top surface of said inner layer; and
            a top; said top of said second material comprising a part of said outer surface; said second material being less easily compressed than said first material.

13. The grip tape of claim 12 wherein said top of said first material is higher than said top of said second material.

14. The grip tape of claim 12 wherein, in lateral cross section, said first material is central and said second material is disposed to both sides.

15. The grip tape of claim 14 wherein said top of said first material is higher than said top of said second material.

16. The grip tape of claim 1 wherein said first material traverses said tape.

17. The grip tape of claim 16 wherein said top of said first material is higher than said top of said second material such that it presents traction enhancing edges for resisting torque.

18. The grip tape of claim 17 wherein said traction enhancing edges are disposed at an angle of less than 30% to the longitudinal axis of the handle.

19. The grip tape of claim 17 wherein said traction enhancing edges are disposed substantially parallel to the longitudinal axis of the handle.

\* \* \* \* \*